United States Patent [19]

Fischer et al.

[11] 4,304,186
[45] Dec. 8, 1981

[54] CAVITY-FORMING SHAPED PART FOR AN ARTICLE, ESPECIALLY A HOLLOW-CHARGE MINE

[75] Inventors: Klaus-Heinz Fischer, Troisdorf; Heinz Kroschel, Troisdorf-Sieglar, both of Fed. Rep. of Germany

[73] Assignee: Dynamit Nobel Aktiengesellschaft, Troisdorf, Fed. Rep. of Germany

[21] Appl. No.: 76,425

[22] Filed: Sep. 17, 1979

[30] Foreign Application Priority Data

Sep. 16, 1978 [DE] Fed. Rep. of Germany ....... 2840362

[51] Int. Cl.³ ............................................. F42B 23/24
[52] U.S. Cl. ................................................... 102/401
[58] Field of Search ..................... 102/8, 4, 7.2, 10, 13

[56] References Cited

U.S. PATENT DOCUMENTS

| | | | |
|---|---|---|---|
| 2,949,853 | 8/1960 | Vogt | 102/10 |
| 3,098,441 | 7/1963 | Amundson et al. | 102/13 |
| 3,543,684 | 12/1970 | Radford | 102/10 |
| 3,875,862 | 4/1975 | Fischer et al. | 102/8 |

FOREIGN PATENT DOCUMENTS 254736 6/1927 United Kingdom .
735031 8/1955 United Kingdom .
822836 11/1959 United Kingdom .
1545664 5/1979 United Kingdom .

*Primary Examiner*—Charles T. Jordan
*Attorney, Agent, or Firm*—Craig and Antonelli

[57] ABSTRACT

A cavity-forming shaped device for use with articles, especially hollow-charge mines, that forms, in an operative position, a cavity tightly sealed all around preferably with a portion of the article. The shaped device has a flexible body portion, at least one ventilating means and means for effecting deployment of the body portion from a collapsed inoperative starting position to an extended operative position. The body portion is folded up, compressed, inverted, or the like in its starting position, and is deployed and ventilated to provide the closed and sealed cavity, in order to place the device into its functional or operative position.

9 Claims, 11 Drawing Figures

CAVITY-FORMING SHAPED PART FOR AN ARTICLE, ESPECIALLY A HOLLOW-CHARGE MINE

The invention relates to a cavity-forming hollow device or part that is operatively associated with an article, especially a hollow charge mine, or like article that requires cover means for damping the impact of the article on the ground.

A hollow-charge mine known from DOS [German Unexamined Laid-Open Application] 2,207,557 is provided at one of its ends with a spherical, elastic cover. The cover extends over an end of the hollow charge, the charge being provided with an inert, preferably metallic lining or insert. This cover is firmly joined to the mine casing in such a way that it constitutes together with the casing a cavity which is sealed all around. This hood-shaped cover serves for damping the impact of the mine on the ground when dropped from the air, in which case the mine is provided with a braking parachute at an end oppositely to the cover, so that the mine hits the ground with the cover forming a damping cushion. After impingement on the ground, the hollow-charge mine according to DOS 1,800,121 is positioned so that the effect of the hollow charge is directed upwardly. In this case, the cover ensures that the necessary free space is present above the hollow-charge insert for the formation of the hollow-charge flash or jet.

For reasons of adapting the mines for stacking and to save space, for example during storage, transportation or installation of the mines in laying systems, it is desirable to reduce the cavity present underneath the cover, i.e. to be able to compress the cover at least approximately into a flat state. In this connection, one must make certain that the cover, before activation of the mines, i.e. for example, when the mines are released during their distribution or laying, will pass over from this initial position with a reduced or optionally also entirely eliminated hollow space, sealed all around, into its operative position wherein the all-around tight hollow space is again fully deployed.

This need exists, in particular, in case of the aforementioned hollow-charge mines, and also, for example, in case of the corresponding dummy mines or in case of bomblets. Furthermore, such a cover and/or such a cavity-forming shaped device also proves to be advantageous, for example, in case of shock-absorbing airbags as they can be provided, for instance, in case of articles or devices, containers, or the like which are to be dropped from the air.

The invention, advantageously, provides a hook-like shock-absorbing cover or, expressed more generally, a cavity-forming shaped device or part for articles, devices, containers or the like, which can be extended to form, in a simple way, a cavity necessary for its respective usage and which seals this cavity against the surroundings; whereas the articles, devices, containers, or the like, when the shaped device is not extended, occupy a corresponding smaller volume during storage, transportation, etc., prior to use. The shaped device or part, especially when formed as a cover, is, in its functional or operative position, hood-shaped, preferably spherical. However, the device can also be, for example, cap-shaped, cushion-shaped, or the like. The shaped device is furthermore preferably formed from an elastic sheetlike material. Such material can be, in particular, elastomers, preferably silicon rubber, but also ethylene-propylene elastomer types, chloroprene polymers, or natural rubber. The shaped device can, however, also consist, for example, of a correspondingly flexible sheetlike material, i.e. a material deformable without elastic elongation, for example in the manner of a folded bellows.

This invention is directed to a device for forming a hollow cavity which is capable of being folded up into a compacted state during storage, i.e. collapsible. The device is provided with one ventilating means which is a continuous opening provided in the shaped device, especially in a cover, this opening being uncovered for the entrance of air, for example in the manner of a globe valve, during the extension of the shaped device and thereafter being resealed, i.e. when the device is in the functional or operative position. Preferably, the opening is also sealed in the starting or collapsed position of the shaped device, i.e. when the cavity is reduced or practically eliminated, to prevent the penetration of moisture, impurities, or the like into the space underneath the shaped device. Insofar as the shaped device is elastic, it is possible, in a very simple embodiment, to seal the opening by means of a ball which is pressed into this opening, the wall of the opening being in contact with part of the spherical surface of the ball under corresponding expansion. During the deployment of the shaped device, the device is also slightly expanded in the zone of the opening, so that a sufficiently large gap is produced between the wall of the opening and the surface of the ball, through which air can enter in an adequate amount underneath the shaped device.

The shaped device or part can be manufactured integrally with the article with which it is operatively associated, but preferably is produced separately therefrom and is then firmly bonded to the article, for example by clamping with the aid of a clamping ring, flanging, glueing, or the like. Preferably, the cavity, which is sealed all around, is defined in part by the shaped device and in part by a portion of the article. However, basically it is also possible for the shaped device proper to bound the cavity on all sides, for example by being fashioned as a cushion, sealed all around, or the like.

To convert the shaped device from its "storage and packaged" position, small in volume, into its functional position with a fully formed, sealed cavity, a deployment force, i.e. extension force, is required. This force can be applied, for example, by means of a compression spring arranged underneath the shaped device when the device forms the cavity with a portion of the article, this spring effecting the deployment of the shaped part into its operative position at a predetermined point in time. This release of the biased compression spring can take place, for instance in case of mines arranged in the manner of a column in series with a tubular distributing means, when these mines are ejected from the distributing means and thus deployed individually.

In a preferred embodiment of the invention, the deployment force is exerted, however, preferably by a draw element attached to an outer exposed portion of the device. The draw element can be, for example, a manually actuatable drawstring, rip cord, draw ring, or the like, for example if the articles are deployed on the ground. However, instead, it is also possible to provide an automatic activation of these draw elements, for example by triggering the elements during the ejection of the articles from distributing means, by the ejection movement proper. When dropping the articles from the air, an aerodynamic braking device, stabilizer, or the like can be advantageously employed, such as parachutes, straps, or the like, which exert a pulling power, for actuating the draw element, or such devices can be utilized as the draw element proper.

The at least one ventilating means of the shaped device is preferably fashioned so that a closing force effective thereon takes care of maintaining the ventilating means in a flawlessly closed position before deployment of the shaped device, as well as thereafter, namely even if, with the device being deployed, external forces act thereon, as they occur, for example when the article with the device rolls along the ground. To open this ventilating means during the deployment step, the ventilating means is provided with an appropriate drawing device which can be operated manually or automatically in the same way as the aforementioned draw element of the device by way of strings, straps, rings, or the like. A combination has proven to be especially advantageous, according to which one and the same device provides the force for effecting the opening of the ventilating means as well as the deployment of the shaped device, i.e. for extension of the device.

The ventilating means can be constructed, for instance, as a spring-loaded globe valve, wherein the globe is connected with a drawing device counteracting the spring force. However, the embodiment is preferred, wherein the elastic deformability of the shaped device and/or of the sealing element proper is used for providing the closing force. For this purpose, a spherical cover of an elastic material is provided, for example, with several apertures or perforations, each of which is sealed by an additional sealing element. These sealing elements are connected on the outside of the cover with drawing devices arranged at that location; these drawing devices, upon their release, e.g. by individually distributing the mines which had been combined into a stack, exert a pulling force on the sealing elements. During this process, the cover and the sealing elements, insofar as the latter are elastic, are elongated to a proper extent. Due to this extension, the sealing elements are lifted off the perforations and/or are reduced in cross section to such a degree that air inlet openings are vacated between the cover and the sealing elements during the effect of the pulling force. Moreover, due to the thus-acting pulling force, the movement of the cover into the upright position is enhanced. The use of the cross-sectional reduction feature for providing air inlet openings is especially preferred for allowing entry of the air, i.e. inflation of the cavity with air. After the cover has been deployed into a convex shape, the openings are closed again by a reduction or elimination of the pulling force, and by the ensuing return of expanded parts to their original position.

In case of a hollow charge with an insert, the shaped device having a sheet-like body portion with the configuration of a hood is advantageously arranged, wherein it preferably contacts the insert. Thereby, the arrangement is not only especially compact, but there is also created advantageously an additional, external stowing or packing space for the accommodation of a parachute, of stabilizer straps, interference, i.e. jamming, materials for radar location, camouflage materials, or the like.

The invention is illustrated in embodiments in the drawings and will be explained in greater detail below with reference thereto. The drawings are substantially illustrations of sectional views wherein.

Figure 1A:
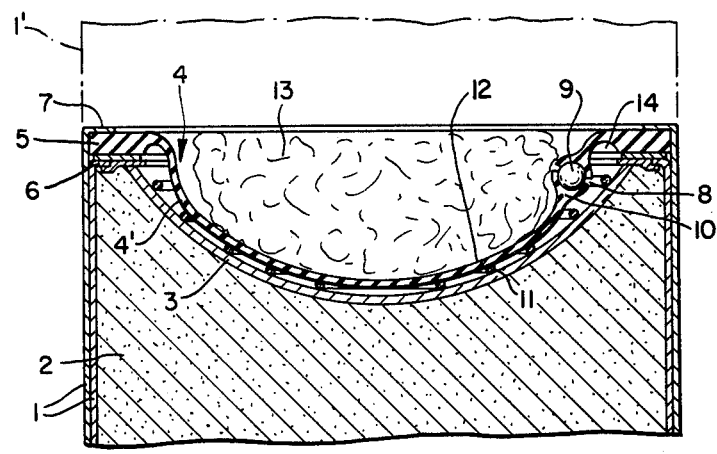
FIGS. 1a and 1b show, respectively, the top portion of a hollow-charge mine with an inverted shaped device providing a cover and with the device being deployed or extended.

According to FIG. 1a, a hollow charge 2 is arranged in the metallic casing 1 of a mine; the hollow charge is provided with the insert 3 on one end, i.e. its topside. A cavity-forming shaped device 4 is in this case formed to provide an elastic, hood-type cover or body portion 4′ having a thickened rim section 5 that is held firmly and tightly between the two annular flanges 6 and 7 of the casing 1. The cover 4 has at least one continuous opening 8 sealed by means of the closure element 9 in the form of a ball. To hold the ball 9 securely in the zone of the opening 8, the cover 4 is provided with the contoured elastic section 10.

FIG. 1a shows the cover 4 in its initial position wherein it is inverted inwardly and is practically in contact with the insert 3 with the interposition of the compressed conical spiral spring 11 which serves to deploy the device to its operative position. In the thus-formed outer depression 12 of the cover 4, a packed parachute 13 for the mine is housed, for example, so that it does not project beyond the topside of the mine. The cavity 14 between the insert 3 and the cover 4, which cavity is sealed with respect to the surroundings, has its minimum size in this position. The cover 4 is held in its starting position against the force of the conical spiral spring 11 by arranging, for example—as indicated in dashed lines—several mines 1′ in series and accommodating this "mine column" in an appropriate tubular packaging unit, laying device, or the like, not shown.

Figure 1B:
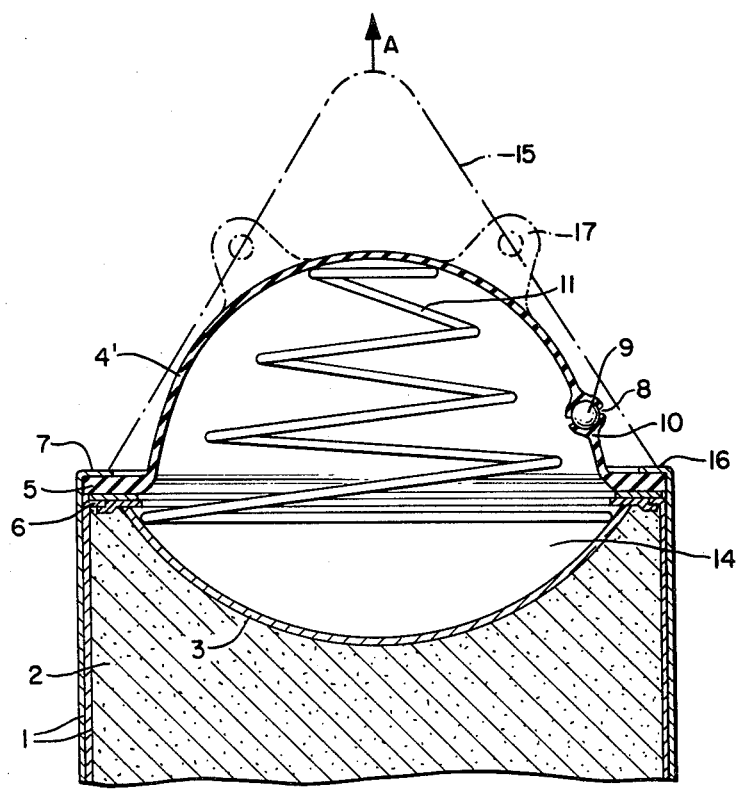

Upon discharge or ejection from this tubular unit, the mines are separated from one another so that the conical spiral spring 11 can effect the deployment of the cover 4, i.e. its expansion into the functional or operative position shown in FIG. 1b. During the deployment step, the cover 4 is expanded or stretched in the zone of the contoured section 10 to such an extent that a gap is produced between the wall of the opening 8 and the ball 9, through which air flows into the cavity 14 formed between the device and the insert portion of the casing 1. In the functional position, the cover 4 is extended in the manner of a sphere and established securely the vacant space required for the proper formation of the cavity. The minimum diameter of the conical spiral spring 11 is preferably determined to be such that the conical spiral spring does not impair the formation of the hollow-charge flash.

In place of the conical spiral spring 11, external draw elements 15 are preferably utilized for the deployment of the cover 4 under practical conditions—as indicated in dot-dash lines in FIG. 1b. These draw elements are the suspension lines establishing the connection between the mine and a parachute and/or its rigging lines with separating catch, not shown. The suspension lines 15 are attached with their lower ends 16 to the casing 1 of the mine and extended through the two tongue-shaped eyelets 17 connected to the cover 4. When the mine is dropped from the air, the draw elements 15 are tensioned by the opening shock of the parachute with the force A acting on their apices and thereby the cover 4 is pulled from its inverted position into the deployed position. If, after dropping the load, a separation of the parachute from the mine is unnecessary, the special suspension lines could be omitted and instead the rigging lines of the parachute could be attached directly to the casing 1 and utilized as draw elements.

The cover 4 deployed in the form of a hemisphere preferably even before the mine strikes the ground, and thereafter being resealed, also has the advantageous effect that the mine, when hitting the ground with its covered end, does not remain in this "topsy-turvy" position but rather automatically falls over into a lateral position, from which it can be placed into its operative position by using the arrangement disclosed in DOS 1,800,121.

Figure 2A:
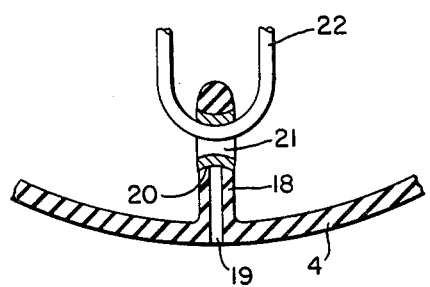
FIGS. 2a through 4b show fragmentary views of shaped devices with various types of ventilating means.
Figure 2B:
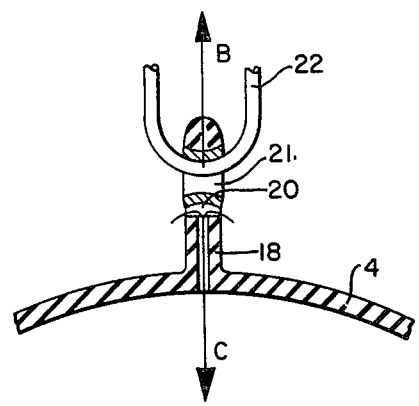

FIG. 2a shows a fragmentary view of an inverted elastic shaped device 4, especially in the form of a cover, with a vertically integrally attached tongue or strap 18 having a longitudinal bore 19 and a transverse bore 20 wherein an eyelet 21 is inserted, with the transverse bore 20 being elastically expanded, thus sealing the longitudinal bore 19. The ring 22, shown only in part, is extended through the eyelet 21. If the tensile force B is exerted by way of this ring 22, functioning as the external drawing device, then the tongue 18 is elongated and, according to FIG. 2b, the dimensionally rigid eyelet 21 is lifted off the longitudinal bore 19 so that air can flow according to arrow C underneath the cover 4 into the cavity. The tensile force B can serve, in addition to actuating the ventilating means, also for placing the cover 4 in an upright position. For example, the tensile force can be applied by means of the connecting lines of an aerodynamic braking device, which lines are extended through the ring 22.

Figure 3A:
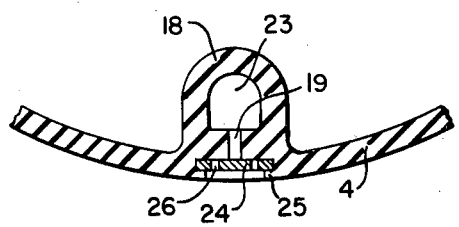
Figure 3B:
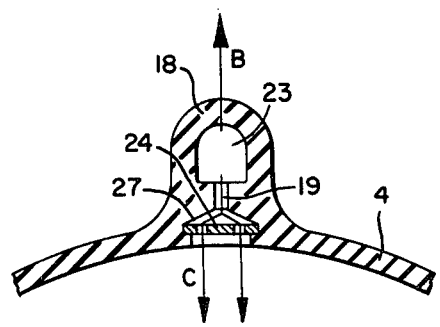

FIGS. 3a and 3b show a similar ventilating means wherein the elastic cover 4 is provided with a strap 18 having a longitudinal bore 19. The strap 18 has furthermore an opening 23, by way of which the tensile force B can be applied. In the downward direction, the longitudinal bore 19 is sealed by means of the disk 24 held in the cover 4 by means of the annular flange 25. Offset with respect to the longitudinal bore 19, the disk 24 has the holes 26 in its marginal zone. The disk 24 is with its unperforated zone in close contact with the lower end of the longitudinal bore 19. When the tensile force B becomes effective, the strap 18 according to FIG. 3b is elongated and lifted off the disk 24 with its zone 27 surrounding the longitudinal bore 19. Thereby, the holes 26 of the disk are vacated so that air can enter in accordance with arrows C. After the tensile force B, exerted manually, for example, has abated, the strap again closely contacts the disk 24 with its zone 27.

Figure 4A:
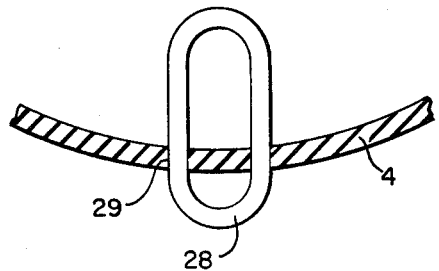
Figure 4B:
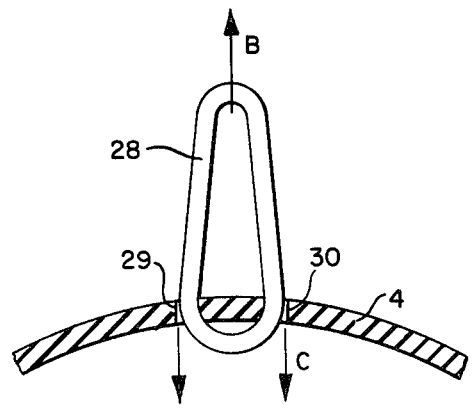

An especially simple embodiment of the ventilating means is shown in FIGS. 4a and 4b, according to which the ring-shaped loop 28 of an elastic material is pulled through two openings 29 of the likewise elastic cover 4. The diameter of the openings 29 is somewhat smaller than that of the loop 28, so that the required sealing effect is obtained by pressing the walls of openings 29 against the loop 28. If, now, as shown in FIG. 4b, the tensile force B again becomes effective on the loop 28, the loop is expanded so that the venting gaps 30 are provided, through which air can flow underneath the cover 4 in accordance with arrows C.

Figure 5A:
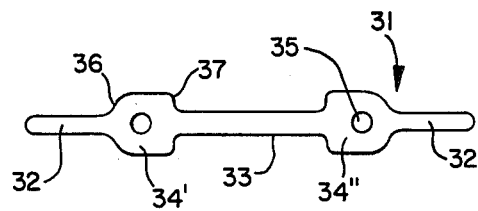
FIGS. 5a through 5c show a spherical shaped device with ventilating means.
Figure 5B:
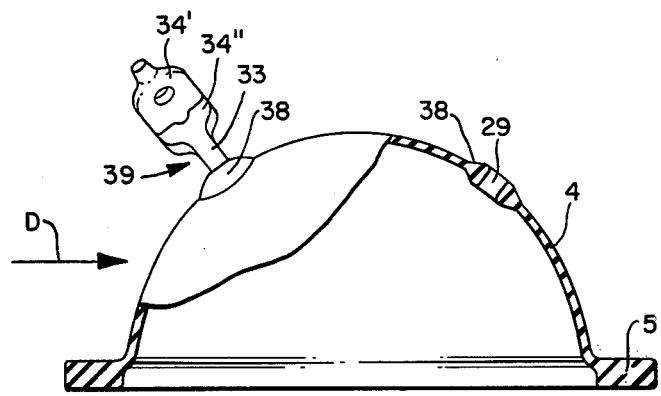
Figure 5C:
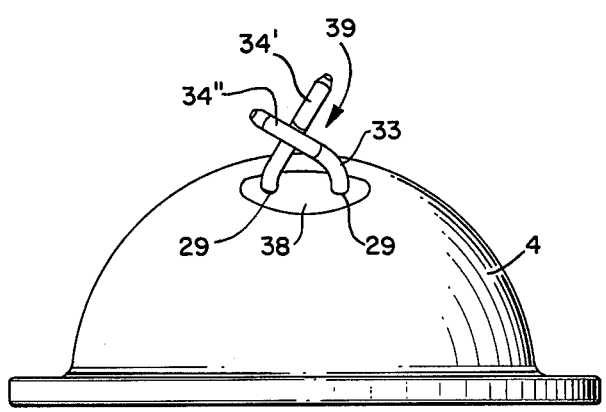

FIGS. 5a through 5c, finally, show a specially preferred ventilating means functioning according to the same principle as that of FIGS. 4a and 4b. FIG. 5a shows the elastic loop element 31, which prior to its installation into the cover has a linear, elongated form and is provided at its two ends with pin-like extensions 32, the diameter of which is smaller than that of the central web 33 of the loop, to facilitate the introduction of these extensions into the openings 29 of the cover 4. Respectively one bead 34', 34" with a cutout 35 is provided between the two extensions 32 and the web 33, wherein the outer flank 36 of the cutout 35 is inclined to facilitate assembly; whereas its inner flank 37, effective as a stop in the assembled condition, is preferably fashioned to be vertical.

FIG. 5b shows the hemispherical cover 4—partially in a sectional view, partially in elevation—with the openings 29 and the thickened sections 38 of the material. The loop element 31 is initially passed with its thickened portions 34', 34" through the two openings from the inside toward the outside, whereupon the thickened portion 34' is pressed through the cutout 35 of the thickened portion 34" so that, analogously to FIGS. 4a and 4b, a "loop" 39 is obtained which is closed along its periphery. The diameter of the thickened web 33 is here again somewhat larger than the diameter of the openings 29, so that the web 33 seals same flawlessly. The circular cutouts 35 of the thickened portions 34', 34", apart from providing a symmetrical shape of the loop element 31, have the advantage that the thickened portion 34' can be more readily compressed when being passed through the opening 29 and the cutout 35 of the other thickened portion 34". The external extensions 32 are severed after assembly. FIG. 5c, representing a view in the direction of arrow D in FIG. 5b, shows clearly the loop 39, on which acts the external tensile force exerted, for example, by a parachute.

We claim:

1. A cavity-forming shaped device for a hollow-charge mine or like article that forms, in an operative position, a cavity tightly sealed all around, said shaped device comprising a flexible body portion for forming said cavity at least in part, at least one ventilating means for allowing entry of ambient atmospheric air into said cavity upon being actuated and means for effecting deployment of the body portion from a collapsed inoperative starting position to an extended operative position and for actuating said at least one ventilating means to allow entry of atmospheric air into said cavity during deployment, said body portion being folded up, compressed, inverted, or the like in its starting position, and being deployed and ventilated to provide the closed and sealed cavity, in order to place said device into its functional or operative position.

2. A cavity-forming shaped device for a hollow-charge mine or like article, that forms, in an operative position, a cavity tightly sealed all around, said shaped device comprising a flexible body portion for forming said cavity at least in part, at least one ventilating means, and means for effecting deployment of the body portion from a collapsed inoperative starting position to an extended operative position, said deployment means comprising at least one draw element located on the outside exposed part of the body portion to provide the deployment force required to extend the body portion into the operative position, said body portion being folded up, compressed, inverted or the like in the starting position, and being deployed and ventilated to provide the closed and sealed cavity, in order to place said device into the operative position.

3. A cavity-forming shaped device for a hollow-charge mine or like article, that forms, in an operative position, a cavity tightly sealed all around, said shaped device comprising a flexible body portion for forming said cavity at least in part, at least one ventilating means, and means for effecting deployment of the body portion from a collapsed inoperative starting position to an extended operative position, the ventilating means being associated with a drawing means for effecting the opening of the ventilating means during the deployment of the device into the operative position, said body portion folded up, compressed, inverted, or the like in the starting position and being deployed and ventilated to provide the closed and sealed cavity, in order to place said device in the operative position.

4. A device according to claim 3, wherein the drawing means of the ventilating means serves simultaneously for providing the deployment force for the device.

5. A cavity-forming shaped device for a hollow-charge mine or like article, that forms, in an operative position, a cavity tightly sealed all around, said shaped device comprising a flexible body portion for forming said cavity at least in part, at least one ventilating means and means for effecting deployment of the body portion from a collapsed inoperative starting position to an extended operative position, the ventilating means comprising an element forming at least one opening in the shaped device, which is provided with a sealing element, wherein the sealing element is in close contact with and/or within the opening by elastic doformation of the sealing element and/or of the shaped device in the opening and this close contact being temporarily eliminated by exertion of tensile stress on the sealing element or on the shaped device.

6. A device according to claim 5, wherein the ventilating means comprises a circular, O-shaped, or similar loop-shaped element made of an elastic material extended through two openings of the shaped device, said loop-shaped element being in tight contact with the wall of both openings under radial pressure, and being reducible in its cross section due to tensile stress in such a way that respectively one ventilating gap is formed between the walls of the openings and the expanded loop-shaped element.

7. A device according to one of claims 1–6, in the form of a cover for a hollow charge mine with an insert at one end wherein the device in its starting position is inverted toward the insert and forms an external depression in which additional components of the mine are accommodated.

8. A device according to one of claims 1 to 6, wherein the shaped device forms, in the operative position, the cavity tightly sealed around with a portion of the hollow-charge mine.

9. A device according to claim 8, wherein the flexible body portion is sealed tightly around an end portion of the hollow-charge mine to form said cavity.

* * * * *